United States Patent [19]

Groesbeck et al.

[11] Patent Number: 5,455,051
[45] Date of Patent: Oct. 3, 1995

[54] PROCESS FOR PREPARING A BLUE CHEESE FLAVORANT

[75] Inventors: Cheryl A. Groesbeck, Shelton; Steven S. Kwon; Dharam V. Vadehra, both of New Milford, Conn.

[73] Assignee: Nestec S.A., Vevey, Switzerland

[21] Appl. No.: 57,046

[22] Filed: Apr. 30, 1993

[51] Int. Cl.$^6$ ........................................... A23C 9/12
[52] U.S. Cl. .............................. 426/35; 426/34; 426/36; 426/37; 426/650
[58] Field of Search ................... 426/36, 37, 38, 426/582, 650, 35, 34, 580, 534

[56] References Cited

U.S. PATENT DOCUMENTS

| | | | |
|---|---|---|---|
| 770,030 | 9/1904 | Trillat | 426/37 |
| 3,072,488 | 1/1963 | Watts, Jr. et al. | |
| 3,100,153 | 8/1963 | Knight | |
| 3,720,520 | 3/1973 | Luksas | 426/42 |
| 4,133,895 | 1/1979 | Kosikowski et al. | 426/33 |
| 4,595,594 | 6/1986 | Lee et al. | 426/35 |
| 4,752,483 | 6/1988 | Hagberg et al. | 426/35 |
| 4,832,964 | 5/1989 | Pratt | |
| 5,139,810 | 8/1992 | Kratky et al. | |
| 5,211,972 | 5/1993 | Kratky et al. | 426/35 |

FOREIGN PATENT DOCUMENTS

| | | |
|---|---|---|
| 184105 | 8/1986 | European Pat. Off. |
| 208545 | 4/1984 | Germany |
| 1361817 | 7/1974 | United Kingdom |

OTHER PUBLICATIONS

Iwasaki, et al., Abstract M11, Increasing Flavor in Cheese with Commercial Microbial Enzyme Preparations, J. Dairy Sci, 56:623, 1973.
Jolly, et al., Abstract M12, Flavor and Chemical Changes in Blue Cheese by Microbial Lipases, J. Dairy Sci, 56:624, 1973.
Jolly, et al. Flavor Development in Pasteurized Milk Blue Cheese by Animal and Microbial Lipase Preparations, J. of Dairy Sci., vol. 58, No. 6, 1975, pp. 846–852.

*Primary Examiner*—Leslie A. Wong
*Attorney, Agent, or Firm*—Vogt & O'Donnell

[57] ABSTRACT

A flavorant composition is prepared by dispersing blue cheese in an aqueous medium containing a buffering agent and then incubating the dispersion with spores of *Penicillium roquefortii* and with lipase and protease enzymes to hydrolyze and metabolize the cheese.

13 Claims, No Drawings

PROCESS FOR PREPARING A BLUE CHEESE FLAVORANT

BACKGROUND OF THE INVENTION

The present invention relates to compositions employed as flavorant additives to foods and particularly to preparation of a blue cheese flavorant composition.

As is known to those skilled in the art of cheesemaking, cheeses known as "blue" cheeses are appreciated not only as a food per se, but also have distinctive flavor characteristics which desirably are employed in a variety of foodstuffs. It is known, for example, to employ blue cheese itself or flavorants having blue cheese flavoring characteristics in oil and water or oil and vinegar emulsions for such as dressing green salads. The characteristic complexity and "sharpness" of the blue cheese flavor also may be employed to add "zest" and distinctive character to other bland foods such as eggs, for example in omelets, and pastas.

As is also known, blue cheese, a semi-soft cheese, is prepared conventionally by fermenting milk and/or milk products for several months with the mold *Penicillium roquefortii*. As the art attests, however, such as illustrated by U.S. Pat. No. 3,072,488, the length of the aging period required to obtain the desirable distinct flavor characteristics of blue cheese is costly in the context of seeking to provide acceptable flavorant additives for foods.

Moreover, when conventionally fermented cheeses, including blue cheese, are employed per se as flavorants, not only do these cheeses add significant undesirable bulk to the food product, but the products also have a relatively short-shelf-life because of the presence of fermentation agents. Thus, it is required that the processing and/or storage conditions of such products be such that the fermentation agents remain inactive. Moreover, such products present the possibility of a consumer experiencing an allergenic reaction because of the presence of fermentation agents.

In addition, as will be appreciated, consumers expect the flavor of products to be consistent from one gustatory experience to the next. However, generally, if a flavorant system is manufactured on an industrial scale with conventional fermentation, final product flavor profiles are difficult to control on a statistically significant quality control basis, and thus, it may be difficult to obtain a consistent final product flavor, for example in a batch to batch context. Moreover, even if consistency is attained by the manufacturer of such a flavorant, consistency of character may be lost if a transporter, or a manufacturer of a product in which the flavorant is employed, or a retailer does not diligently control, for example, storage conditions.

To address these considerations and problems, various methods have been proposed for preparing cheese character flavorants, including blue cheese flavorants, which have objectives of short preparation time, consistent quality and stability for long periods.

U.S. Pat. No. 3,100,153 discloses that a cheese character flavorant may be produced in a matter of days by incubating mold cells of *Penicillium roquefortii*, and white mutants thereof, or *Penicillium camemberti*, in milk or in mixtures of milk and cream to hydrolyze fats to convert them into aromatic ketones. It also is disclosed that lipases or other fat-splitting enzymes hasten the reaction and conversion.

U.S. Pat. No. 3,072,488, which makes reference to the above-noted '153 patent, addresses a problem resultant from employing mycelium ferments and directs that the process be carried out with a spore inoculum of the bacteria under submerged aerobic conditions. British Patent Specification 1,361,817 likewise discloses employment of spores and teaches that a particularly preferred blue cheese flavorant is prepared when coconut oil is employed as a source of fat.

U.S. Pat. No. 4,832,964 discloses a process for preparation of a blue cheese flavorant by liberating $C_4$ to $C_{14}$ free fatty acids from fats and oils by chemical or enzymatic hydrolysis and then fermenting the free fatty acids with spores of *Penicillium roquefortii* under submerged aerobic conditions with agitation, after which the fermentation and hydrolysis agents are deactivated.

SUMMARY OF THE INVENTION

We have discovered that a flavorant composition having intensified blue cheese character, which addresses problems noted above, may be obtained by treating blue cheese itself.

In particular, the present invention provides a process for the preparation of a blue cheese flavorant composition characterized in that an aqueous dispersion containing blue cheese and a buffering agent is prepared, and then the dispersion is incubated under a submerged aerobic agitated condition with spores of *Penicillium roquefortii* and with lipase and protease enzymes at a pH of below about 7 at a temperature sufficient for the spores and the lipase and protease enzymes to hydrolyze and metabolize the blue cheese. The incubated dispersion then is heated to deactivate the spores and the enzymes.

DETAILED DESCRIPTION OF THE INVENTION

In practice of the present invention, any cheese of the blue cheese variety may be employed, and such preferably is employed in a particulate form to facilitate its dispersal in water for preparation of the aqueous cheese dispersion. Formation of the dispersion is effected most advantageously by employing blue cheese having a particle size of from about 0.25 cm to about 0.75 cm. The aqueous cheese dispersion may contain from about 40% to about 80% and preferably contains from about 50% to about 70% of blue cheese by weight based on the total weight of the dispersion. Preferably, sterile water is employed.

Since blue cheese is available conventionally in blocks, most advantageously, the blocks first are size-reduced to a particulate form, which may be achieved with various known particulation equipment and processes. However, portions of blue cheese as large as 15 $cm^3$, for example, or slices having a size of, for example, from 15 cm×5 cm may be employed if suitable mixing and blending equipment is employed during the dispersion phase of the process which size-reduces the cheese during preparation of the aqueous dispersion.

The dispersion may be formed by employing equipment known in the art such as blenders, food processor liquefiers, or homogenizers, which include means to chop, grind and/or pulverize the cheese to particulate bits to achieve, preferably, a substantially homogeneous dispersion of cheese particles in water. Preferably, an aqueous dispersion having a pasty or emulsion-type character, in which the cheese particles have a size of, for example, less than about 0.5 cm, advantageously is prepared.

When dispersing the cheese in water, it also is advantageous to carry such out at a temperature somewhat above ambient room temperature. Hence, it is preferred to heat the cheese and water before and/or during the dispersing operation to a temperature on the order of up to about 32° C., and preferably from about 28° C. to about 31° C.

During the flavorant producing reaction, the pH of the blue cheese dispersion or mixture is controlled and maintained at a pH of below about 7 and preferably, from about 5 to about 7, and as was discovered, the lower the reaction pH, the more desirable the flavor characteristics. However, it also will be found from practice of the invention that the pH of the incubation reaction mixture tends to drop and become more acidic during incubation, and, it also will be noted that in the pH range of from about 7 to a pH of about 5, the lower the pH, the slower the reaction rate. Thus, for an optimum balance of desirable flavor characteristics, efficiency and avoidance of lengthy reactions, which may affect microbiological stability, the pH of the incubation reaction mixture desirably is controlled and maintained at a pH of from about 5.7 to about 6.2.

Preferably, the reaction pH is controlled and maintained solely by means of a buffering agent. Preferred buffers include citrate or phosphate salt buffers. However, it also is possible to control the pH by employing not only a buffering agent but also by employing a base, preferably sodium, potassium, or calcium hydroxide, preferably in aqueous form, a consequence of which is imparting a salty characteristic to the final product. In addition, as will be appreciated, since the pH of the reaction mixture tends to drop during the incubation, it is desirable to monitor the pH and add buffering agent, and/or a base as noted above, during the incubation to control the pH.

It also has been discovered that the buffering agents provide not only a pH control function, but also by adding the buffering agent to the water prior to dispersing the cheese in the water, or to the water and cheese during dispersion, the buffering agent provides an emulsifying function which facilitates dispersion of the cheese.

Various subspecies and strains of *Penicillium roquefortii*, particularly those employed commonly in the art of blue cheese-making, may be employed, but it is essential that spores be employed since miciella provide too much metabolic activity. The *Penicillium roquefortii* spores may be employed at a level of from about $10^6$ spores/g cheese to about $10^{10}$ spores/g cheese and are employed preferably on the order of from about $4 \times 10^8$ spores/g cheese to about $8 \times 10^8$ spores/g cheese. In general, the spores employed are in a concentration of from about 1% to about 6%, preferably from about 2% to about 5%, by weight based on the total weight of the dispersion.

As is known, the spores of *P. roquefortii* may be carried on bread crumbs. In that case, the spores preferably are separated from the bread crumbs, such as by washing, before the incubation step of the present invention, and advantageously, the spore wash water may be employed as a part of the water into which the cheese is dispersed, with the dispersion being carried out in two steps. That is, the dispersion of the cheese to be treated may be begun with a first quantity of cheese and of sterile water, and then the spore wash water, which advisedly is sterile, may be added and the dispersion continued. In such case, the amount of water employed in the first dispersion phase may provide at least about 25% and preferably from about 25% to about 35% by weight water based upon the total amount of water employed for dispersion of the cheese. In addition, it has been discovered that employing a surfactant, such as TWEEN, for example, in the wash water aids spore-based crumb separation and provides higher active spore yields.

On the other hand, the spores employed may be, if desired, centrifuged to separate them from a carrier, as is known in the art, to provide the spores in the form of a pellet which can be incorporated into the dispersion.

The lipase and protease enzymes are added to the cheese dispersion, preferably just prior to beginning the incubation step of the invention. A substantial variety of lipolytic and proteolytic enzymes may be employed, the use criteria being that the enzymes employed be stable and active at the pH of the reaction. As one skilled in the art will appreciate, depending upon their activities and purity nuances, which may be gathered from manufacturer's specifications, for example, an effect upon the character of the final product may be noted in practice of the present invention. That is, as is known, differing lipases have differing reactive specificities to lipid carbon chains, and differing proteases may impart at least a hint of and/or differing characters of bitterness, which, if desired, may be addressed by means known in the art. Thus, as will be appreciated, differing lipases and proteases and combinations thereof will provide ultimate product chemical compositional differences and hence, different flavorant nuances.

The lipase enzyme(s) employed preferably has particular activity for carbon chains having lengths less than 14 carbons. The lipase may be of animal origin, such as pregastric lipase, gastric lipase and/or pancreatic lipase, or the enzymes may be derived from microbial sources, such as *Mucor sp., Aspergillus niger, Rhizopus oryzae, Candida cylindracea* or *Penicillium sp.*, and the enzymes may be employed alone or in combination. The lipase enzyme(s) may be employed in an amount of from about 0.01 u/g (esterase unit "u" per gram) cheese to about 0.80 u/g cheese and preferably from about 0.02 u/g cheese to about 0.40 u/g cheese.

The protease enzyme(s) employed may be obtained from animal, vegetable and, particularly, from microbial sources such as from *Bacillus subtilis, Aspergillus niger, Rhizopus oryzae, Aspergillus oryzae*, or *Mucor sp.*, and combinations of protease enzymes may be employed. NEUTRASE protease is preferred.

The protease enzyme(s) is employed desirably in amounts of from about 0.125 AU/kg (Anson unit "AU" per kg) cheese to about 10 AU/kg cheese and preferably from about 0.375 AU/kg cheese to about 6.75 AU/kg cheese.

Note also is made that pancreatin may be employed, since such provides both lipase and protease enzymatic activity. In general, however, a combination of pregastric lipase and NEUTRASE protease is preferred.

The submerged aerobic incubation condition may be achieved by various means known in the art by introducing oxygen into the incubating mixture, which may be achieved conveniently by passing, or sparging, air into the mass of the incubating mixture at, for example, a rate of from about 200 cc/min to about 5000 cc/min. Although the introduction of oxygen, or air, provides agitation of the inoculating mixture, the mixture preferably is agitated further, such as by stirring.

The incubation, therefore, should be carried out in a vessel provided with means for providing the submerged aerobic agitation conditions, such as by having means for introduction of oxygen or an oxygen-containing gas, e.g., air, into the incubating mixture and by having other mechanical agitation means, such as a stirrer, and the vessel interior should be sterilized prior to the incubation. Preferably, the incubation vessel has gas introduction means positioned to extend into at least a bottom portion of the vessel. Likewise stirring means is positioned in at least a bottom portion of the vessel. As also will be appreciated, the vessel should have means, such as jacketing, for heating and cooling the reaction mixture.

The incubation may be carried out at temperatures on the order of up to about 55° C., but temperatures preferably on the order of from about 20° C. to about 40° C. and especially on the order of from 25° C. to about 35° C., are employed. Although flavor profile differentiation will occur upon initiation of the incubation reaction, and hence be a time sufficient for a flavor profile change, it generally is desirable to terminate the incubation within about 48 hrs to avoid a potential problem of microbiological instability. Incubation periods on the order of from about 12 hrs to about 30 hrs, and preferably from about 18 hrs to about 24 hrs, provide process stability and ultimate desirable flavorant profile and intensity-enhanced results.

After incubation, the incubated dispersion is heated to deactivate the mold and enzymes. Preferably, the heating is carried out by such as pasteurizing the incubated dispersion. This deactivation may be carried out in a closed previously sterilized vessel at a temperature of from about 60° C. to about 90° C. for a period of from about 2 mins to about 40 mins. As may be appreciated, the deactivation may be carried out in the incubation vessel, if suitably equipped, such as with steam injection means, or the incubated mixture may be transferred to a different deactivation means. High temperature-short time deactivation/pasteurization processes, as are known in the art, also may be employed.

After deactivation, the incubated dispersion product may be cooled, and before, during, or after a cooling operation, undesired solid matter, such as previously unseparated carrier bread crumbs desirably is separated from the product.

Advantageously, a preservative composition is incorporated in the product of the described procedure for inhibiting growth of molds and bacteria in the final product. Preservatives such as sorbic acid, or an edible salt thereof, e.g., potassium sorbate, which have been found to be particularly effective, may be incorporated at any time during the process, but for ease of uniform incorporation, a perservative composition may be added most advantageously to the incubating dispersion prior to termination of the incubation. The preservative(s) may be added in an amount up to about 1%, preferably from about 0.01% to about 0.5%, by weight based on the total weight of the dispersion or incubated product.

Although the blue cheese flavorant of the present invention may be incorporated into variety of products immediately, such as in salad dressing bases, sauces, snack foods and soup bases, it may be chilled by refrigeration or frozen for future use. In addition, however, before incorporation into a product, the product of the invention may be subjected to homogenization to reduce cheese particle size to provide a creamy consistency and enhance the uniformity of flavor intensity impact.

As will be appreciated, the solids content of the product will depend upon the amount of water employed in the process. Thus, should one desire, water may be removed by various known means to concentrate the product, and/or the product may be dehydrated to a stable moisture content, i.e., a moisture content of from about 2% to about 6% by weight, for example, by spray-drying or freeze-drying the product alone or in combination with food-acceptable flavorant carriers, e.g., maltodextrin and milk solids and equivalents thereof, as is known in the drying art. Alternatively, the product composition may be separated into oil and water fractions to obtain the oil fraction, and in that case, flavorant volatiles may be stripped from either or both fractions by known means to prepare an even more concentrated and intensified flavorant product.

In a further embodiment of the present invention, which provides a blue cheese flavorant composition having enhanced dairy background flavor notes, milk fat, or a product containing a milk fat, such as heavy cream or a lipolyzed cream, may be incorporated in the dispersion, preferably during dispersing of the cheese with the water and buffering agent. On the other hand, a lipolyzed cream may be mixed with the incubated product before or after deactivation. As is conventionally appreciated in the art, a heavy cream generally is a cream containing at least about 35% to 36% milk fat. In the practice of the present invention, the lipolyzed cream is obtained preferably by the action of a lipase on a heavy cream. Preferably, a *Penicillium roquefortii* lipolyzed cream, obtained preferably by treating a heavy cream with *P. roquefortii* spores, is employed.

Although an amount of milk fat in a form of heavy cream, for example, may be employed in an amount up to, or in excess of about 10% by weight based upon the total weight of the product mixture, noted flavor enhancement is obtained with amounts on the order of, for example, from about 0.5% to about 5%, and amounts on the order of from about 0.75% to about 4% by weight based on the total weight of the product mixture preferably are employed.

As will be found from practice of the present invention, total amounts of methyl ketone components of the product are increased substantially over that of the starting blue cheese material, and the ratios of, for instance, $C_7$, $C_9$ and $C_{11}$ methyl ketones are altered by the process of the invention. As will be found from practice of the invention, increases of the total amount of $C_7$, $C_9$ and $C_{11}$ methyl ketones on the order of from 4 to 5 times the amount of such contained in the starting material may be achieved readily, and in the case of treating a combination of heavy cream and cheese, the total amount of methyl ketones of the product may be on the order of from 7 to 8 times greater than the amounts of those ketones in the starting cheese.

EXAMPLES

The following Examples further illustrate the present invention, and unless otherwise indicated, parts and percentages are by weight.

Example I

About 1.2 kg of bread crumbs carrying *Penicillium roquefortii* spores (Midwest Blue Mold—Dairyland Food Laboratories) are washed three times with quantities of sterile water which provide about 10 kg of washing water containing the spores separated from crumbs.

About 23 kg of particulated blue cheese is added incrementally to and dispersed in about 3 kg of sterile water containing about 1.6 kg of sodium citrate in a sterile jacketed liquefier vessel having particulation means operating to dispense the cheese and maintain a temperature of about 30° C. After adding about one-half of the cheese, the spore-containing water is added to the vessel, and the remainder of the cheese is added incrementally while continuing to operate the liquefier vessel to disperse the cheese.

The dispersion is introduced into a sterile vessel, which has heating means, gas introduction means and stirring means. About 0.37 kg of protease (Novo NEUTRASE 0.5 L) and about 0.2 kg of lipase (AMANO PGE lipase) contained in about 0.7 l water are added to the dispersion. The dispersion is stirred and air is introduced into the dispersion at a rate of about 2 l/min while the temperature is maintained at about 28° C. to 30° C. for about 24 hrs.

After about 23 hrs, about 0.1 kg potassium sorbate is added to the incubating dispersion.

After the incubation, the incubated mixture is pasteurized at a temperature of about 82° C. for about 15 mins, and then the pasteurized product is cooled.

The flavorant product produced has blue cheese character which, in comparison with the starting cheese, is intensified substantially.

Example II

About 170 g of a blue cheese are dispersed in about 80 g water which contains about 9.4 g of sodium citrate in solution to obtain an aqueous dispersion having an emulsion character. About 9 g of *P. roquefortii* spores and about 24 g of water are added to the dispersion together with about 6 ml of an approximately 5% w/w solution of PGE lipase, about 1.4 g NEUTRASE protease and about 3 ml of 1N sodium hydroxide. The mixture is stirred and incubated at a temperature range of from about 29° C. to about 34° C. during a period of about 24 hrs while air is introduced into the stirred mixture. The incubated mixture then is pasteurized, refrigerated and then subsequently homogenized for being taste-tested in a salad dressing base.

The flavorant product provides an intensified blue cheese character, and differs from the product of Example I in that it has a salty taste. In addition, in comparison with a product made in accordance with U.S. Pat. No. 4,832,964, although the product of the patent has a greater blue cheese flavorant intensity, the product of this example is preferred because the patent product has a "soapy" character and a more salty taste. The product of this Example has a distinctly more acidic character and more rounded cheesy background top notes than the patent product.

Example III

A blue cheese dispersion is prepared as in Example II together with 30 g of a lipolyzed heavy cream. About 9 g of *P. roquefortii* spores are added to the dispersion together with about 2 ml of the 5% lipase solution, about 0.5 g NEUTRASE protease and about 3.5 ml of 1N sodium hydroxide. The mixture is incubated as in Example II above and then pasteurized and chilled and homogenized.

This flavorant product also has a distinctly intensified blue cheese flavor and has, in comparison with the product of Example II, more intensified buttery top background notes.

Example IV

An experiment is performed in accordance with the materials and methods of Examples II and III except that heavy cream is added to the dispersion and no sodium hydroxide is employed. The product has an intensified rounded blue cheese character, lacks the salty character and has significant buttery top notes.

As may be appreciated from the foregoing, various modifications of the present invention may be made without departing from the spirit and scope of the disclosure, and the invention may be practiced suitably in the absence of elements not specifically disclosed herein.

We claim:

1. A process for preparation of a flavorant composition comprising dispersing blue cheese in water and with a buffering agent to obtain an aqueous dispersion of the blue cheese, incubating the aqueous dispersion with spores of *Penicillium roquefortii* and with lipase and protease enzymes under submerged agitated aerobic conditions at a pH of below about 7 at a temperature sufficient for the spores and the lipase and protease enzymes to metabolize and hydrolyze the blue cheese and then heating the incubated dispersion to deactivate the spores and enzymes to obtain a flavorant composition.

2. A process according to claim 1 wherein the pH is from about 5 to about 7.

3. A process according to claim 1 wherein the pH is from about 5.7 to about 6.2.

4. A process according to claim 1 wherein the buffering agent is selected from the group consisting of a citrate salt buffering agent and a phosphate salt buffering agent.

5. A process according to claim 1 wherein the aqueous dispersion, spores and enzymes are incubated for from about 12 hrs to about 36 hrs.

6. A process according to claim 1 further comprising adding and dispersing heavy cream to and with the cheese, water and buffering agent.

7. A process according to claim 1 further comprising adding and dispersing a lipolyzed cream to and with the cheese, water and buffering agent.

8. A process according to claim 1 further comprising adding and mixing a lipolyzed cream to and with the flavorant composition.

9. A process according to claim 1 further comprising, prior to heating the incubated dispersion to deactivate the spores and enzymes, incorporating a preservative composition into the incubating dispersion for inhibiting growth of molds and bacteria in the flavorant composition subsequent to incubation and deactivation.

10. A process according to claim 1 further comprising removing water from the flavorant composition to concentrate the flavorant composition.

11. A process according to claim 1 further comprising dehydrating the flavorant composition to a stable moisture content.

12. A process according to claim 1 wherein the spores are carried on bread crumbs and further comprising washing the spores and bread crumbs with a wash water containing a surfactant and adding and dispersing the spores and wash water to and with the water, buffering agent and cheese to prepare the dispersion.

13. A process according to claim 1 wherein the spores are in an amount of from about $10^6$ spores/g cheese to about $10^{10}$ spores/g cheese, the lipase is in an amount of from about 0.01 u/g cheese to about 0.80 u/g cheese, the protease is in an amount of from 0.125 AU/kg cheese to about 10 AU/kg cheese.

* * * * *